United States Patent
Liang

(10) Patent No.: US 8,307,654 B1
(45) Date of Patent: Nov. 13, 2012

(54) TRANSITION DUCT WITH SPIRAL FINNED COOLING PASSAGE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 481 days.

(21) Appl. No.: 12/563,618

(22) Filed: Sep. 21, 2009

(51) Int. Cl.
F02C 1/00 (2006.01)

(52) U.S. Cl. ................................. 60/752; 60/39.37

(58) Field of Classification Search ............ 60/752–760, 60/39.37; 431/158, 160, 353
See application file for complete search history.

(56) References Cited

U.S. PATENT DOCUMENTS

| | | | | |
|---|---|---|---|---|
| 710,130 A * | 9/1902 | Weiss | ................ | 60/39.48 |
| 2,603,064 A * | 7/1952 | Williams | ................ | 60/757 |
| 2,617,255 A * | 11/1952 | Niehus | ................ | 60/748 |
| 3,398,527 A * | 8/1968 | Taylor et al. | ................ | 60/752 |
| 3,572,031 A * | 3/1971 | Szetela | ................ | 60/757 |
| 3,706,203 A * | 12/1972 | Goldberg et al. | ................ | 60/757 |
| 3,736,747 A * | 6/1973 | Warren | ................ | 60/732 |
| 4,195,474 A * | 4/1980 | Bintz et al. | ................ | 60/730 |
| 4,201,047 A * | 5/1980 | Warren et al. | ................ | 60/39.63 |
| 5,327,727 A * | 7/1994 | Ward | ................ | 60/757 |
| 5,724,816 A * | 3/1998 | Ritter et al. | ................ | 60/752 |
| 5,737,922 A * | 4/1998 | Schoenman et al. | ................ | 60/752 |
| 5,833,450 A * | 11/1998 | Wunning | ................ | 431/215 |
| 6,018,950 A * | 2/2000 | Moeller | ................ | 60/752 |
| 6,098,397 A * | 8/2000 | Glezer et al. | ................ | 60/772 |
| 7,104,067 B2 * | 9/2006 | Bunker | ................ | 60/752 |
| 7,373,778 B2 * | 5/2008 | Bunker et al. | ................ | 60/752 |
| 7,603,843 B2 * | 10/2009 | Froehlich | ................ | 60/257 |
| 7,908,867 B2 * | 3/2011 | Keller et al. | ................ | 60/753 |
| 2005/0044857 A1 * | 3/2005 | Glezer et al. | ................ | 60/772 |

* cited by examiner

Primary Examiner — Phutthiwat Wongwian
(74) Attorney, Agent, or Firm — John Ryznic

(57) ABSTRACT

A transition duct for a gas turbine engine of the kind with can combustors, the transition duct is formed from an inner section and an outer section that form a spiral shaped cooling channel from an inlet end to an outlet end. The spiral channel includes a number of fins that extend into the cooling air passage. an annular plate with an annular arrangement of exit holes closes an aft end of the spiral cooling channel and forms an expansion chamber for the exit holes.

5 Claims, 2 Drawing Sheets

View A-A

View B-B

TRANSITION DUCT WITH SPIRAL FINNED COOLING PASSAGE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to an air cooled transition duct positioned between a combustor outlet and a turbine inlet.

2. Description of the Related Art Including Information Disclosed Under 37 CFR 1.97 and 1.98

A gas turbine engine includes a combustor that produces a hot gas flow and a turbine that receives the hot gas flow to produce mechanical work. The turbine includes a row of first stage stator vanes that receive the hot gas flow from the combustor and guide the flow into the first stage rotor blades. The highest temperature gas flow is found between the combustor outlet and the first stage rotor blades.

A combustor can be an annular combustor formed from two concentric walls or a plurality of can combustors arranged in an annular array around the engine. Annular combustors are typically used in aircraft engines. Can combustors are typically used in large industrial gas turbine engines. In both combustor types, a transition piece is needed to guide the hot gas flow from the combustor exit into the first stage guide vanes. In the annular combustor, the combustor exit is already annular in shape so not much redirecting is required. The exit flow from the annular combustor can flow directly into the first stage guide vanes.

In the can combustor arrangement, the hot gas flow from the combustor exit must be transformed from a circular flow to a segment of an annular flow. A transition duct in the IGT (industrial gas turbine) engine is circular in the inlet end and some-what rectangular in the outlet end so that the combined flow of all of the can combustors will be in an annular flow path at the inlet to the first stage stator vanes. The transition duct of the engine is exposed to the highest gas flow temperature. Thus, improved cooling of the transition duct will increase the part life.

BRIEF SUMMARY OF THE INVENTION

It is an object of the present invention to provide for a transition duct of a gas turbine engine with improved cooling capability that will reduce the metal temperature and therefore require less cooling air flow.

It is another object of the present invention to provide for a transition duct of a gas turbine engine with internal cooling air passages that do not require a ceramic core and investment casting process to form the transition duct cooling circuit.

It is another object of the present invention to provide for a transition duct of a gas turbine engine with an internal cooling air circuit that can modulate the cooling air flow and pressure with the transition duct.

It is another object of the present invention to provide for a transition duct of a gas turbine engine with an internal cooling air circuit that can be tailored to an internal surface heat load in order to achieve a desirable streamwise metal temperature.

It is another object of the present invention to provide for a transition duct of a gas turbine engine with an internal cooling air circuit that produces a higher internal heat transfer coefficient that prior art transition ducts.

The above objective and more are achieved with the transition duct for a gas turbine engine of the present invention, where the transition duct includes a spiral shaped flow channel with fins that is machined through milling into the cone section of the transition duct. The spiral flow channel can be in a two dimensional convergent race track shape with a plurality of fins extending between side walls of the channel. The spiral flow channel has a tight radius of curvature formation from inlet to exit planes as the cone converges and thus the change of cooling flow momentum which enhances the channel heat transfer performance. This is deviated from the traditional constant height flow channel which is flowing parallel to the main stream flow. The spiral finned flow channel can be placed closer to the hot side wall to achieve the near wall cooling for a better cooling performance.

DETAILED DESCRIPTION OF THE INVENTION

Figure 1:
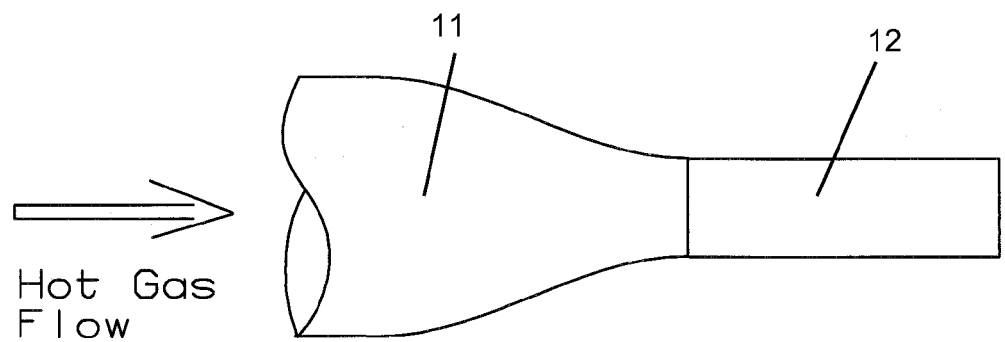
FIG. 1 shows a schematic view form the side of a transition duct of the present invention with a cone section and an intermediate exit piece.

The present invention is a transition duct for a gas turbine engine that uses a plurality of can combustors. One transition duct is used for each cab combustor to guide the hot gas flow from the combustor outlet to the inlet of the first stage guide vanes. FIG. 1 shows the transition duct 10 of the present invention with a cone section 11 on the inlet end and an intermediate exit piece (IEP) 12 on the outlet end. A hot gas flow passes into the cone section 11 and exits the IEP 12. A number of transition ducts are used in a gas turbine engine that uses can combustors. The inlet to the transition duct is circular to conform to the circular shaped exit of the can combustor. The outlet of the transition duct 10 is rectangular but with an annular curvatures in order to produce a total annular outlet for all of the transition ducts.

Figure 2:
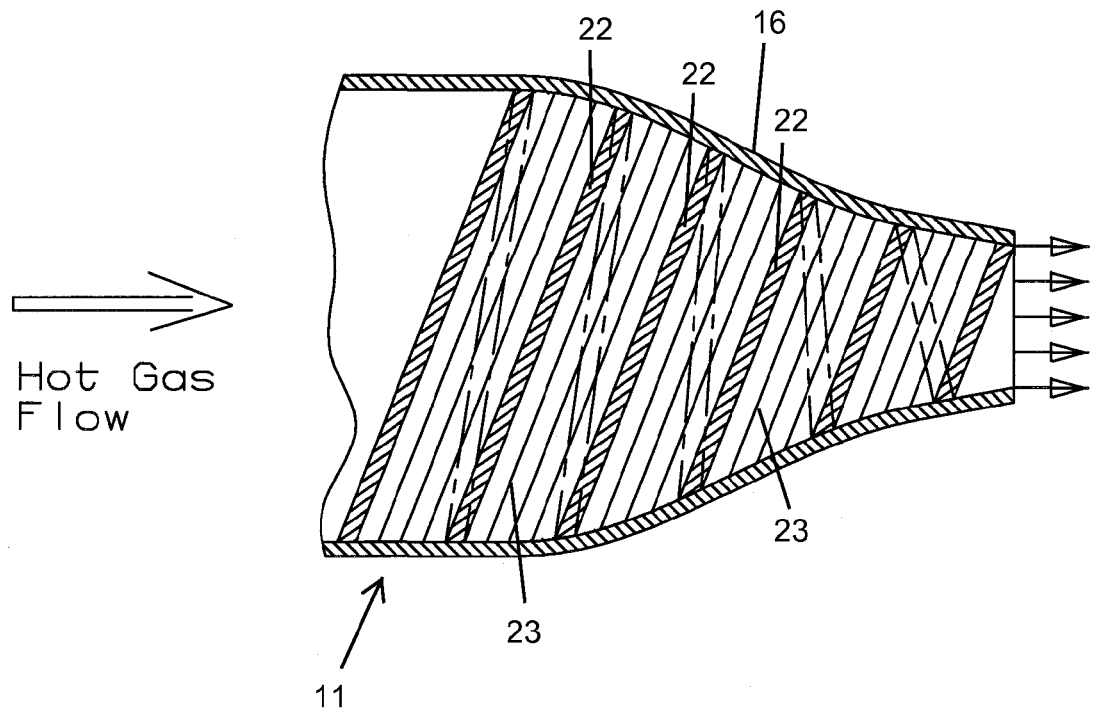
FIG. 2 shows a cross section view of the cooling air paths in the cone section of the transition duct of the present invention.

The cone section 11 of the transition duct 10 of the present invention is formed from an inner section 15 that fits within an outer section or sleeve 16 to form the comical section of the transition duct 10. The conical section includes a spiral shaped groove that has an opening on the inlet end of the conical section and an opening on the outlet end so that cooling air can pass through the spiral groove formed within the conical section. FIG. 2 shows an arrangement of the spiral groove formed by a spiral rib 22 that spirals around the conical section 11.

Figure 3:
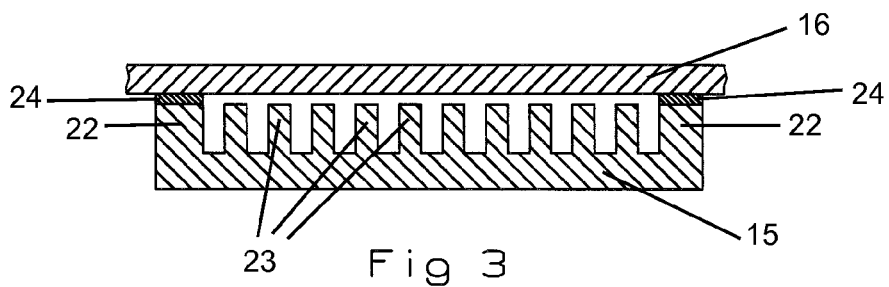
FIG. 3 shows a cross section view of a section of the transition duct down a channel in the direction of the cooling air flow.

The spiral rib 22 forms the spiral groove around the conical section and functions as mate faces for the inner section against the outer section. FIG. 3 shows details of this configuration. The spiral ribs include flat top surfaces that form a bonding surface with the outer section 16. A tap weld or other bond 24 can be used to secure the inner section 15 to the outer section or sleeve 16. A number of fins 23 extend from the inner section and into the spiral channel stopping just short from the sleeve 16 and function to increase the metal surface for the cooling air passing through the spiral channel. One rib 22 spirals around the cone section to form one spiral channel in which a number of fins extend.

Figure 4:
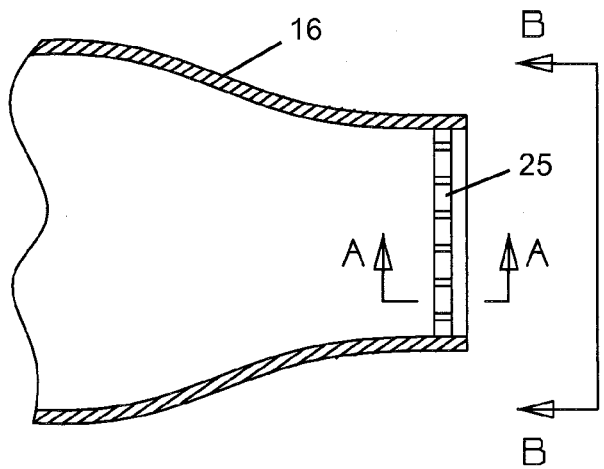
FIG. 4 shows a cross section view of the exit end of the cone section with an annular arrangement of exit holes.
Figure 5:
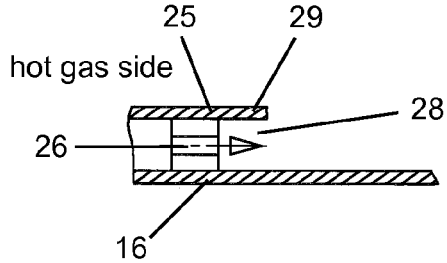
FIG. 5 shows cross section view of one of the exit holes taken along line A-A of FIG. 4.
Figure 6:
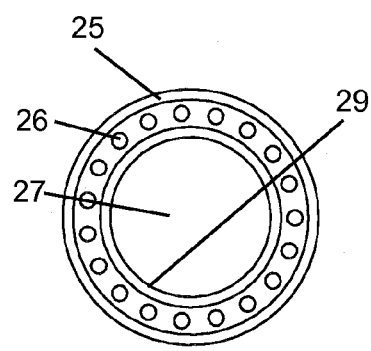
FIG. 6 shows a rear view of the cone section exit end with the exit holes take along line B-B of FIG. 4.

An exit end of the conical section 11 with the outer sleeve 16 is shown in FIG. 4 and includes an annular arrangement of exit holes formed in an annular plate 25 to discharge the cooling air from the spiral channel and onto an outer surface of a downstream component. FIG. 6 shows a rear view of the plate 25 with the annular arrangement of exit holes 26 and the hot gas flow path 27 in the center. FIG. 5 shows a cross section view of one of the exit holes 26 through line A-A in FIG. 4. The exit holes 26 opens into an expansion chamber 28 downstream of the exit hole 26 and formed by an exit hole lip 29. The lip 29 forms the surface on which the hot gas flow passes as seen in FIG. 6.

Cooling air is fed through the cooling manifold at the junction of burner basket and transition duct and then bleeds into the spiral flow channel and finally exits out the transition duct through a row of metering hole. In general, the cooling air accelerates through the spiral flow channel as the transition duct radius of curvature become tighter and the diameter decreases, thus increasing the channel flow internal heat transfer performance from the flow channel entrance to exit. At the entrance region of the spiral flow channel where the radius of curvature is large and the cone external heat load is not as high as the exit plane section; the demand for the channel internal heat transfer coefficient is not as high as the exit section. As the cooling air approaches to the exit plane corner, the radius of curvature for the spiral flow channel becomes much smaller; the change of cooling air momentum rapidly increases, and therefore augments the internal channel heat transfer coefficient to a much higher level prior to being discharged through the transition duct. Furthermore the micro fins incorporated into the spiral flow channel further enhanced the internal convective capability of the cooling passage.

With spiral cooling channel and fins of the present invention, a maximum usage of cooling air for a given transition duct heat load and pressure profile is achieved. In addition, the convergent spiral flow cooling design of the present invention yields a higher internal convection cooling effectiveness than the prior art parallel channel cooling technique used in the state-of-the-art transition duct cooling design.

Major design features and advantages of this cooling scheme over the conventional straight channel cooling designs are enumerated below. The convergent spiral flow channel modulates the cooling flow and pressure to the transition region. The milling machining of spiral flow channel eliminates the casting of parallel cooling mechanism thus minimizes fragile ceramic core and breakage of ceramic core thus enhances manufacturing yields. The convergent spiral flow channel cooling approach can be tailored to the external airfoil heat load to achieve desirable streamwise metal temperature distribution. The spiral finned flow channel cooling approach can be milled onto the inner wall of the cooling duct at closer distance to the hot side wall thus create a near wall cooling technique and optimize the cooling performance. Cooling of the transition duct can be achieved with lower cooling flow rate. A simpler milling machining technique produces a lower cost transition duct cooling design. High internal heat transfer coefficient is created at the turns and transition duct exit region where is needed for the transition duct exit region cooling. Acceleration of cooling flow within the convergent spiral flow channel creates higher rate of heat transfer for the transition duct exit region cooling. This is inline with the transition duct external heat load. Thus achieve a parallel heat load cooling concept.

I claim the following:

1. A transition duct for a gas turbine engine to channel a hot gas flow from a combustor into a turbine, the transition duct comprising:
    a cone section and an intermediate exit piece, the cone section forming an inlet end for the transition duct and the intermediate exit piece forming an outlet end for the transition duct;
    the cone section having an outer section and an inner section that form a cooling air passage from an inlet to an outlet of the cone section;
    a spiral cooling air channel formed by spiral ribs that extend between the inner section and the outer section and extending from the inlet end to an outlet end of the cone section; and,
    a plurality of fins extending into the spiral cooling channel to increase a heat transfer rate to the cooling air.

2. The transition duct of claim 1, and further comprising:
    the spiral rib includes a top surface that forms a bonding surface to the outer section.

3. A transition duct for a gas turbine engine to channel a hot gas flow from a combustor into a turbine, the transition duct comprising:
    a cone section and an intermediate exit piece, the cone section forming an inlet end for the transition duct and the intermediate exit piece forming an outlet end for the transition duct;
    the cone section having an outer section and an inner section that form a cooling air passage from an inlet to an outlet of the cone section;
    a spiral cooling air channel formed between the inner section and the outer section and extending from the inlet end to an outlet end of the cone section; and,
    a plurality of fins extending into the spiral cooling channel to increase a heat transfer rate to the cooling air;
    an annular plate forming an outlet end of the cone section; and,
    an annular arrangement of exit holes formed in the annular plate to discharge the cooling air from the spiral channel.

4. The transition duct of claim 3, and further comprising:
    the inner section includes an exit hole lip exposed to a hot gas flow and extending past the annular plate to form an expansion chamber for the exit holes.

5. A transition duct for a gas turbine engine to channel a hot gas flow from a combustor into a turbine, the transition duct comprising:
    a cone section and an intermediate exit piece, the cone section forming an inlet end for the transition duct and the intermediate exit piece forming an outlet end for the transition duct;
    the cone section having an outer section and an inner section that form a cooling air passage from an inlet to an outlet of the cone section;
    a spiral cooling air channel formed between the inner section and the outer section and extending from the inlet end to an outlet end of the cone section; and,
    a plurality of fins extending into the spiral cooling channel to increase a heat transfer rate to the cooling air; and,
    the plurality of fins extend from the inner section and stop short of the outer section surface to allow for cooling air to flow across the fins.

* * * * *